United States Patent
Grandi

[19]

[11] Patent Number: 5,975,202
[45] Date of Patent: Nov. 2, 1999

[54] MOBILE TROLLEY FOR DISTRIBUTING HOT AND COLD MEAL TRAYS HAVING WARMING-UP AND REFRIGERATION CAPACITIES

[76] Inventor: René Grandi, Via Marco 4, Campione d'Italia, 22060, France

[21] Appl. No.: 09/029,257

[22] PCT Filed: Sep. 8, 1995

[86] PCT No.: PCT/FR95/01157

§ 371 Date: Mar. 6, 1998

§ 102(e) Date: Mar. 6, 1998

[87] PCT Pub. No.: WO97/09575

PCT Pub. Date: Mar. 13, 1997

[51] Int. Cl.⁶ .................................................. F25B 29/00
[52] U.S. Cl. ..................... 165/918; 165/919; 165/48.1; 312/236; 99/483; 62/434; 62/59
[58] Field of Search ........................... 165/918, 919, 165/48.1; 62/430, 434, 435, 436, 59, 452.2; 312/236; 99/483

[56] References Cited

U.S. PATENT DOCUMENTS

| | | | |
|---|---|---|---|
| 1,513,357 | 10/1924 | Webber | 165/919 |
| 2,459,337 | 1/1949 | Raney | 62/59 |
| 3,160,452 | 12/1964 | Rothman | 312/236 |
| 3,199,579 | 8/1965 | Foster et al. | 165/48.1 |
| 3,205,033 | 9/1965 | Stentz | 165/919 |
| 3,389,946 | 6/1968 | Nicolaus et al. | 312/236 |
| 3,808,401 | 4/1974 | Wright et al. | 165/918 |
| 5,069,273 | 12/1991 | O'Hearne | 165/919 |
| 5,086,834 | 2/1992 | Grandi | 165/135 |
| 5,159,973 | 11/1992 | Pennington et al. | 165/918 |
| 5,201,364 | 4/1993 | Tippmann et al. | 165/918 |
| 5,243,834 | 9/1993 | Hachinohe et al. | 62/434 |
| 5,351,745 | 10/1994 | Park | 165/918 |
| 5,404,935 | 4/1995 | Liebermann | 165/918 |
| 5,477,915 | 12/1995 | Park | 165/918 |
| 5,491,979 | 2/1996 | Kull et al. | 165/919 |
| 5,655,595 | 8/1997 | Westbrooks, Jr. | 165/918 |

FOREIGN PATENT DOCUMENTS

| | | | |
|---|---|---|---|
| 2652885 | 4/1991 | France . | |
| 2659-548 | 9/1991 | France | 165/918 |
| 2684281 | 6/1993 | France . | |
| 2689222 | 10/1993 | France . | |

*Primary Examiner*—Ira S. Lazarus
*Assistant Examiner*—Terrell McKinnon
*Attorney, Agent, or Firm*—Greenblum & Bernstein, P.L.C.

[57] ABSTRACT

PURPOSE: To facilitate a bending of a core and to reduce a resistance of fluid by a method wherein a fin at one end is overlapped integrally between each of rows from a deformation part of the core and the other end fin is separated for each of the rows and contacted and fixed to a tube, respectively.

CONSTITUTION: Tubes 1 and 2 are arranged in a thickness direction of a core. The tubes pass through several fins 3 and 4. The fin 3 is provided with tube insertion holes of circular form in two rows. Outside tube and the core part formed by the fin 4 are projected longer than that of the core. A reamer is placed within the tube to expand an outer diameter and then the tube is press fitted to the fin. A bending machining guide jig 6 is placed within the core, an external force is applied to the core as indicated by an arrow and bent. In this way, since only the fin at the bent portion is separated for every tube, its bending may easily be carried out and at the same time it is possible to reduce a fluid resistance with the integral fin 3.

11 Claims, 7 Drawing Sheets

MOBILE TROLLEY FOR DISTRIBUTING HOT AND COLD MEAL TRAYS HAVING WARMING-UP AND REFRIGERATION CAPACITIES

The subject of the present invention is a mobile trolley for distributing hot and cold meal trays having warming-up and refrigeration capacities with self-contained reserve and regeneration of negative kilocalories.

It is intended for the distribution of meal trays comprising a part with hot dishes and a part with cold dishes, which must be kept at a low temperature while waiting for the appropriate part of the tray to be warmed up for the consumption of the hot dishes.

There are known trolleys for distributing meal trays comprising an on-board compressor for keeping them cold. But these means require certain equipment, i.e., compressors, evaporators, condensers, etc., these elements being substantially fragile in the context in which they are used, and represent a weight surplus and a bulkiness that is difficult to transport in addition to the indispensable loaded weight of the trolley.

Moreover, this method of refrigeration does not allow movement and transportation between the preparation and packaging site and the distribution and consumption site of the meals, sites which are quite often remote and which require transfer by trucks that are not always refrigerated. Thus, in order to remedy these transportation drawbacks, some of them use dry ice, an expensive and volatile product which, moreover, runs the risk of freezing the food.

The device according to the invention eliminates these drawbacks and is completely appropriate for addressing current concerns about the freon gasses which damage the ozone layer. In the future, the storage of refrigerant gasses or CFCs in closed places such as kitchens or distribution offices will no longer be permitted, and it is currently essential to have different means for producing negative kilocalories.

Although the means for achieving the object of the invention also use a / refrigeration generator, they have fewer consequences for the environment since they can be located and installed in the open air or in unoccupied spaces. Moreover, a single installation can cool a large number of trolleys at once.

The device that is the subject of the invention also allows the trolley to be self-contained while retaining the desired properties, namely that the trolley can be transported from one place to another and can wait for several hours before being warmed up, while retaining the negative kilocalories it contains.

It is embodied in the form of a mixed trolley for distributing meal trays wherein some foods, located on the warmed-up part of the tray, have been cooked then cooled and stored in order to be distributed later after a warming-up operation.

The trolley is constituted by an isothermal housing containing the meal trays and separated into two areas by a wall that is also isothermal, provided with as many horizontal slots for trays as the trolley can hold, and into which the trays are inserted, thus completely closing off and isolating the two areas, one of which is cold and the other hot or mixed.

These slots comprise rotary joints for closing off the empty space left by the trays when they are removed, in order to prevent the heat from the hot area from penetrating into the cold area.

This wall defines on the trays the part with the dishes that remain cold and the part containing the dishes to be warmed up.

The mixed area contains reheating as well as refrigeration elements. The two areas are kept cold during the waiting periods until the predefined moment when the mixed area performs its warming up function before the meal is distributed. The trays are accessible through two opposite doors on either side of the trolley.

The refrigeration is constituted by a double reserve for storing negative kilocalories. The first, which comprises a liquid having a high refrigeration capacity that reaches $-50°$, is used to cool the second reserve, which has a circulating liquid coolant. The very low temperature of the first liquid is necessary to maintain a sufficient reserve of negative kilocalories over time, but this type of temperature would freeze the products contained in the trays, hence the necessity for the second reserve of liquid wherein the temperature is regulated and which draws the necessary negative kilocalories from the first reserve as a function of the temperature of the housing.

The refrigeration and regulation of this second reserve is carried out by means of one or more rotary cylinders comprising thermoinsulating and thermoconducting sectors which make it possible to prevent or allow the passage of the negative kilocalories depending on the position of these cylinders.

The composition of the liquids is different, but it is imperative that they be nonharmful and food-safe.

The liquid of the first reserve is either pre-refrigerated outside the reserve by a refrigeration generator and then injected into said reserve, thus being replaced constantly, or refrigerated by a network of coils connected to a refrigeration unit which regenerates the reserve directly.

This latter step is important, since during the warming up at the consumption sites, the juxtaposition of hot and cold creates a large demand for negative kilocalories. It is also possible to connect the trolley directly to a refrigeration unit during the warming up at the distribution sites. A single refrigeration unit can be used for a large number of trolleys.

The liquid of the second reserve circulates in a closed circuit around the housing by means of an assembly of ducts with fins using electrically controlled pump valves and nonreturn valves to circulate the negative kilocalories throughout the housing and for evacuating them around the mixed housing during the warming up, to a storage reserve.

Turbines disperse the negative kilocalories over the meal trays through a system for circulating air over the fins of the ducts containing the liquid coolant, after which the air is sucked up through the upper center of the trolley and forced back so as to pass over the fins of the ducts again in order to take on negative kilocalories, and so on.

In the mixed part, the turbines disperse cold air or hot air equally and successively, as needed.

The operation of all these means is motorized and supplied with electric power at the trolley preparation and warming up sites, but during the transportation or disconnection period, a rechargeable battery takes over.

Different variants for the refrigeration of the liquid coolant reserves may be envisioned without changing the function of the subject of the invention.

In these variants, it is possible to use the type of refrigeration and warming up described in French patent No. 92.06161 or in French patent No. 92.03982, in which the trolley is connected to a device comprising a coolant storage tank as well as a calorie-producing plate. When connected in this way, this device sends to one of the fluid coolant reserves, preferably the second reserve or buffer reserve, the negative kilocalories accumulated during the waiting period. Likewise, the plate makes it possible to reheat the warming-up area, which uses either resistors or a circuit of thermal oil capable of rising to 300° C. This circuit duplicates the one used by the negative kilocalories around the hot area of the trolley and has the same shape that it does. The thermal oil is heated by a single unit of resistors then propelled by a circulation pump to each tray individually or collectively. After the cool air has been evacuated, the turbines take over to deliver hot air.

It is also possible to house large, vertically disposed heat pipes which draw the heat (plate) at their base and transmit the calories all the way to the top of the housing. These calories can reach 200° C. This variant with heat pipes avoids the need for a circulation pump, while having the same functions.

In another variant, if the external means do not make it possible to regenerate and introduce the liquid coolant into the first reserve, either due to the absence of a refrigeration unit or the lack of an adequate installation, it is possible to consider providing aboard the mobile trolley a small, low-power, lightweight, domestic compressor, housed in the trolley in a substantially protected way. This compressor makes it possible, by means of coils, to refrigerate the first reserve during the waiting period prior to the distribution of the meal trays.

In the appended drawings, given as a non-limiting example of one embodiment of the subject of the invention:

Figure 1:
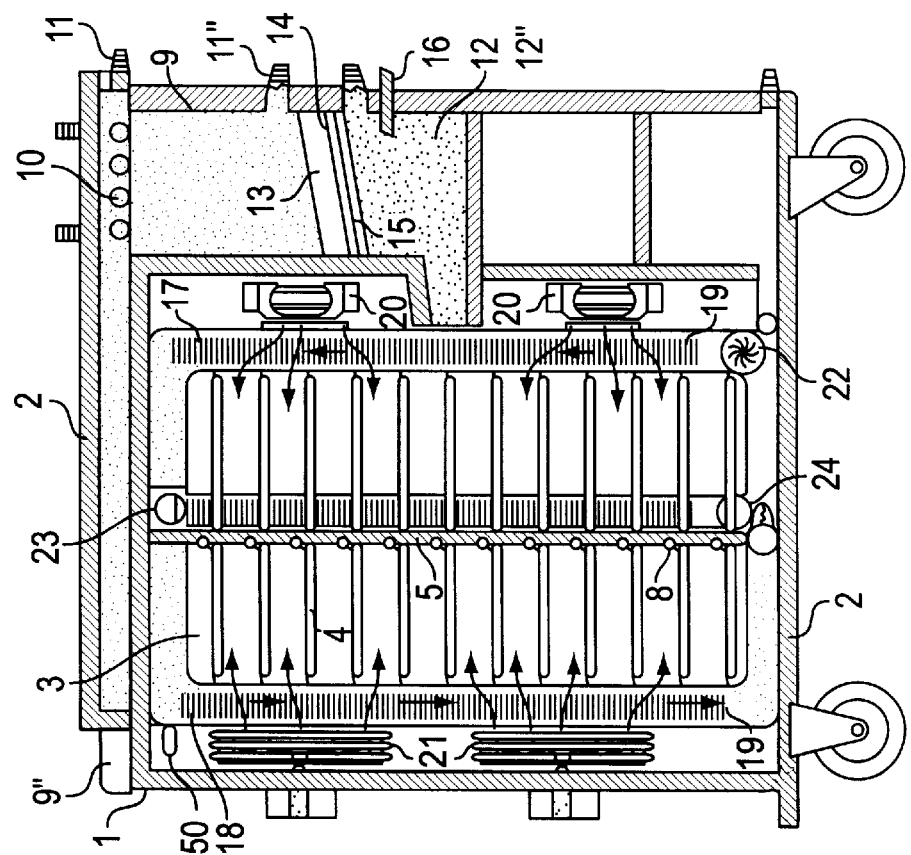
FIG. 1 represents the trolley in its entirety, seen in vertical cross-section with its elements in the full refrigeration stage.

The device (FIG. 1) is constituted by the assembly of the trolley 1 provided with an extensive thermal insulation 2 and comprising a housing 3 which receives the meal trays 4, divided by an isothermal wall 5 into two areas, the permanent refrigeration area 6 and the mixed area 7 to be warmed up after being kept under refrigeration. The wall 5 comprises for each tray a slot with a rotary joint 8 which closes off the space that remains open when the tray is removed.

A first reserve 9 of super-coolant liquid disposed in the upper part of the trolley 1 comprises coils 10 for cooling, using external means, the contained liquid, which is introduced and evacuated through quick-release couplings 11 and 11". An expanding vessel 9" allows the air to be evacuated during the introduction.

The negative kilocalories of this reserve are dispersed into a buffer reserve 12 by one or more rotary cylinders 13 comprising negative kilocalorie heat exchanging tubes 14 (thermoconducting sectors), these cylinders being contained in the insulating wall 15 separating the two reserves 9 and 12. The buffer reserve 12 contains a fluid coolant 12" that is less powerful than that of the first reserve, in which the negative kilocalories are brought to an adequate temperature predetermined by the thermostat 16, by means of the cylinders 13 with the heat exchanging tubes 14.

The fluid coolant 12" circulates in a closed circuit in ducts 17, 18 which surround the double housing 3 and are equipped with fins 19 that diffuse the negative kilocalories throughout the two areas 6 and 7 by means of turbines 20, 21 that produce an air flow which passes through the fins 19. A circulation pump 22 activates the circulation of the fluid coolant 12". Electrically controlled valves 23 and 24 close or open a central duct 25, normally closed, which is opened to reinforce the refrigeration of the area 6 during the warming up. An automatic vent 50 allows proper circulation of the fluid coolant 12".

Figure 2:
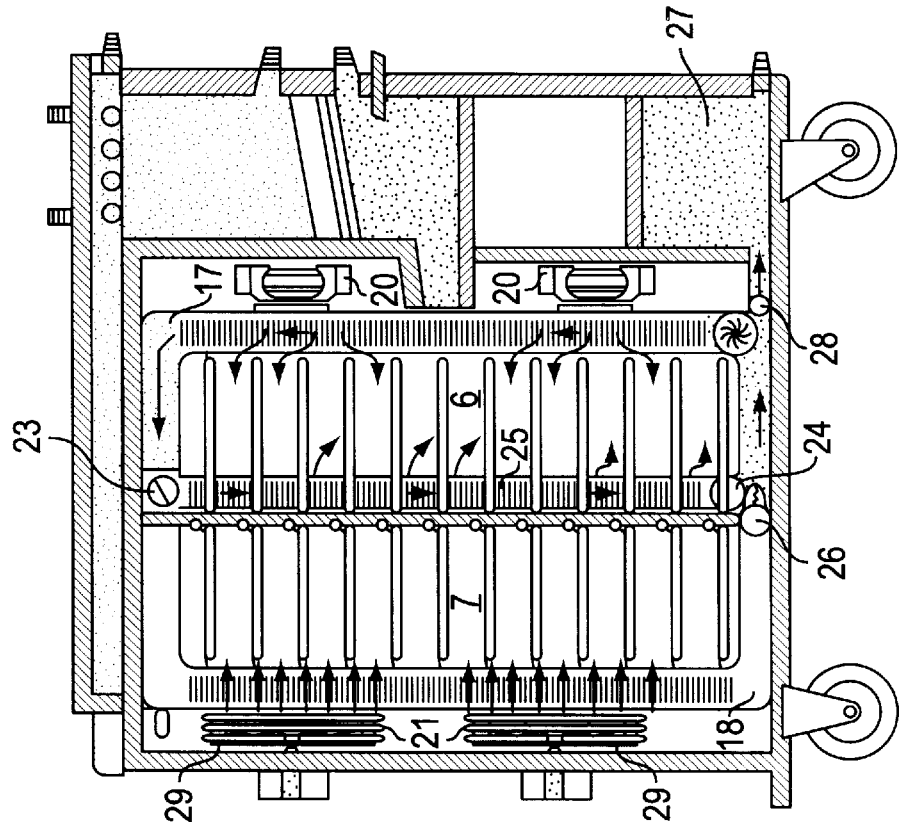
FIG. 2 shows the trolley under the same conditions, with its elements in the warming up stage.

In FIG. 2, the area 6 is still refrigerated, while the mixed area 7 is in the process of being warmed up. For this reason, the fluid coolant 12" is evacuated from the duct 18 surrounding the hot area 7 by an electrically controlled pump valve 26 into a recovery reserve 27. The electrically controlled valve 28 opens this reserve 27, whereas the electrically controlled valves 23 and 24 open the central duct 25 while blocking the passage of the liquid coolant 12" to the duct 18 surrounding the hot area 7.

In this configuration, the calories are produced by resistors 29, and propelled into the hot area 7 by the ventilators 21 (the latter also agitate the cold air when the housing is completely refrigerated). Around the area 6, the refrigeration continues through the ducts 17 and 25 as well as through the turbines 20.

Figure 3:
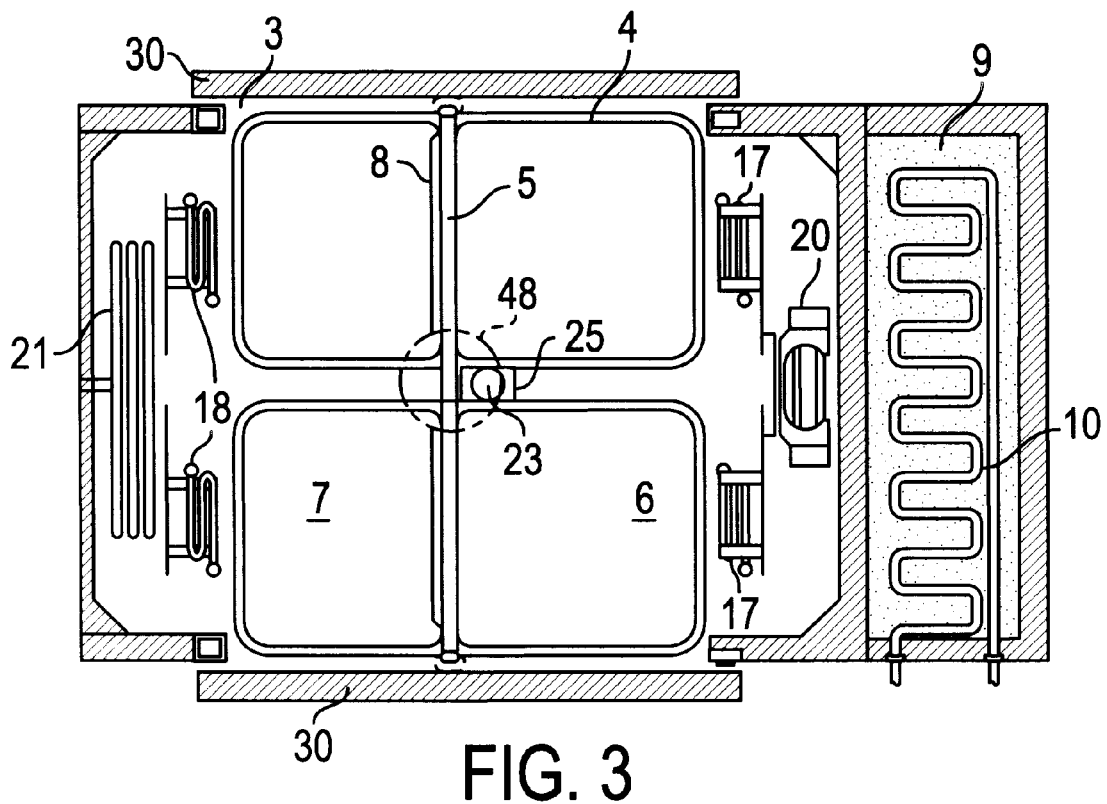
FIG. 3 is a horizontal section showing the internal elements of the trolley.

As seen in FIG. 3, the housing 3 contains a double stack of meal trays 4 introduced through openings 30, and the two areas 6 and 7 are separated by the wall 5 with rotary joints 8. The first reserve 9 contains the coil 10. The ventilating turbines 20 and 21 propel the negative kilocalories from the ducts 17 and 18, which are sucked up to the upper center of the trolley by an exhaust turbine 48 which forces them to pass over the fins 19 again in order to take on negative kilocalories, and so on.

In the mixed area 7, the turbines 21 circulate cold air or hot air equally and successively, as needed.

Figure 4A:
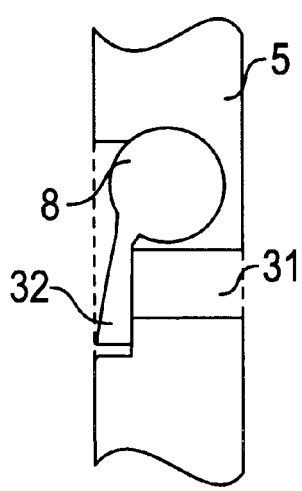
FIG. 4 shows a detail of a rotary joint of the isothermal wall; in A it closes off the slot, and in B it is open in the presence of a tray.
Figure 4B:
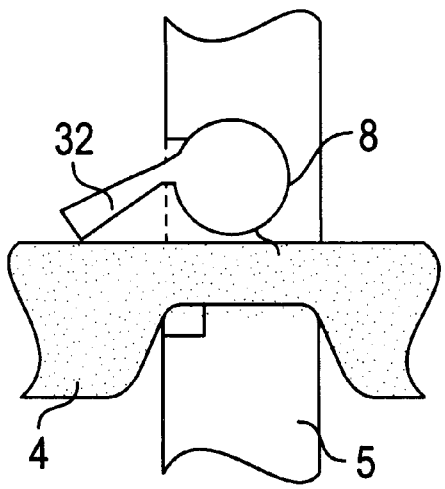
Figure 5:
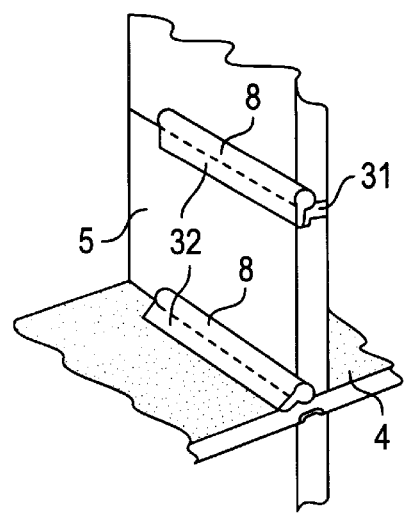
FIG. 5 is a partial view in perspective, at a different scale, of the isothermal wall equipped with rotary joints.

FIG. 4 shows, in A, the isothermal wall 5 with a rotary joint 8 closing off the slot 31 by means of a longitudinal stop 32 in the absence of a meal tray, and in B, the rotary joint opened by the presence of a tray 4. The insertion of the tray produces a pressure on the base 33 of the joint, causing the stop 32 to be raised. In the perspective view in FIG. 5, the joint 8 occupies the entire length of the slot 31 to be closed by the stop 32 on the lateral part of the wall 5. In the presence of the tray 4, the stop 32 is raised.

Figure 6:
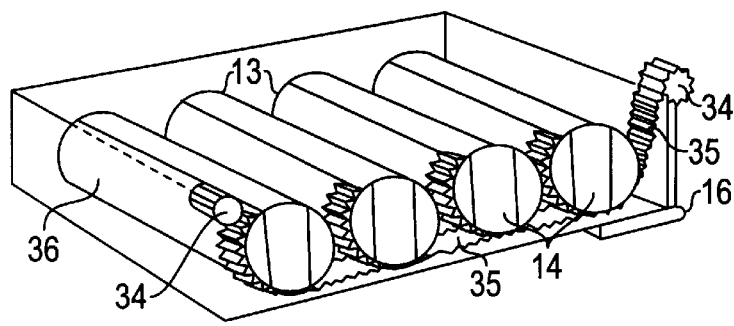
FIGS. 6 and 7 are schematic representations in perspective of the temperature change regulating system with rotary cylinders, showing respectively the latter in the conducting and insulating positions.
Figure 7:
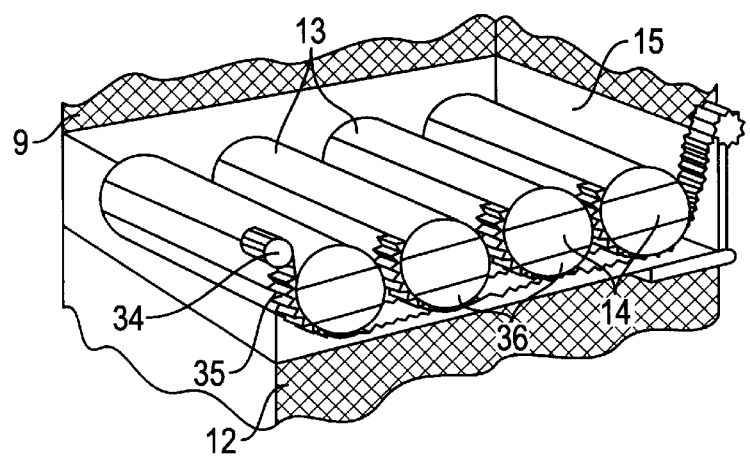

In FIGS. 6 and 7, the regulation of the negative kilocalories between the first reserve 9 containing super-cooling liquid and the buffer reserve 12 is carried out by one or more rotary cylinders 13, each comprising a heat exchanging tube 14 and installed in the insulating wall 15 or in an appropriate enclosure.

The opening (FIG. 6) or the closing (FIG. 7) of the thermoconducting tubes 14, and hence of the negative kilocalories, is achieved by means of a rotation controlled by a drive system 34 acting on a chain 35, which system is controlled by a thermostat 16. This rotation determines the opening (FIG. 6) and the closing (FIG. 7) of the rotary cylinders 13; the latter also comprises thermoinsulating sectors 36 for the heat exchanging tube 14.

Figure 8:
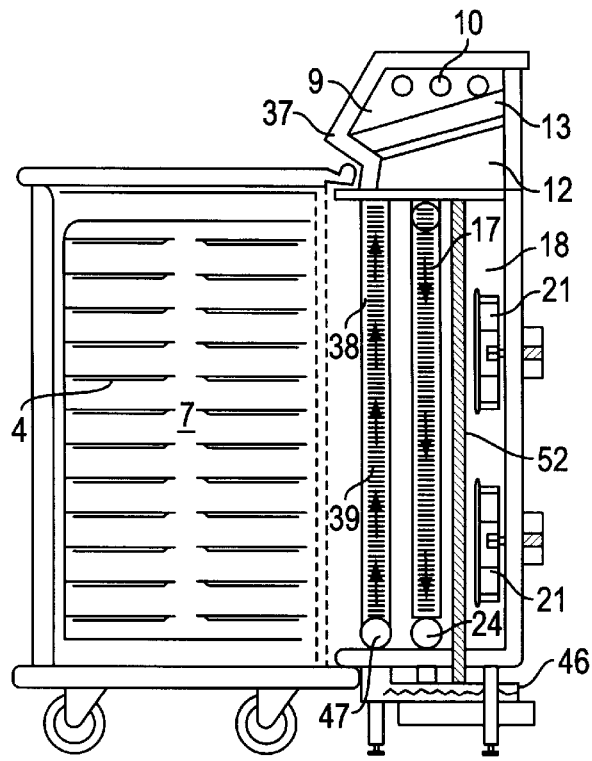
FIGS. 8, 9 and 10 show, in vertical cross-section, in vertical longitudinal section, and in horizontal section, respectively, a variant in which the trolley is detachable from the module containing the refrigeration and warming up means.
Figure 9:
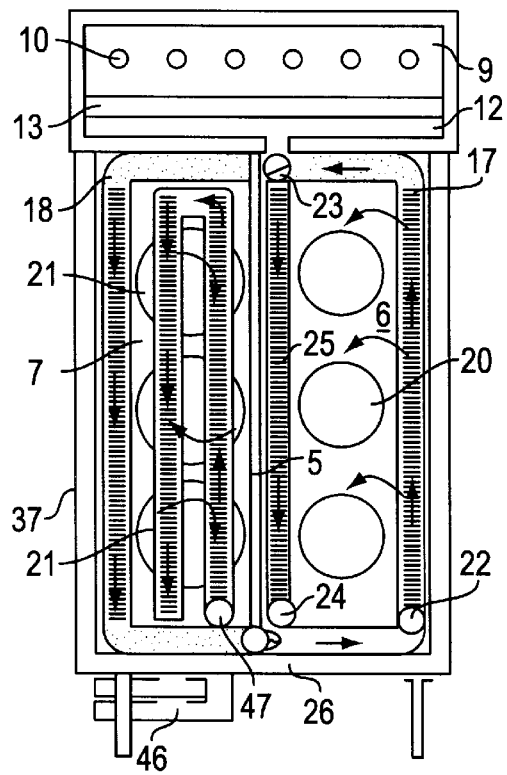
Figure 10:
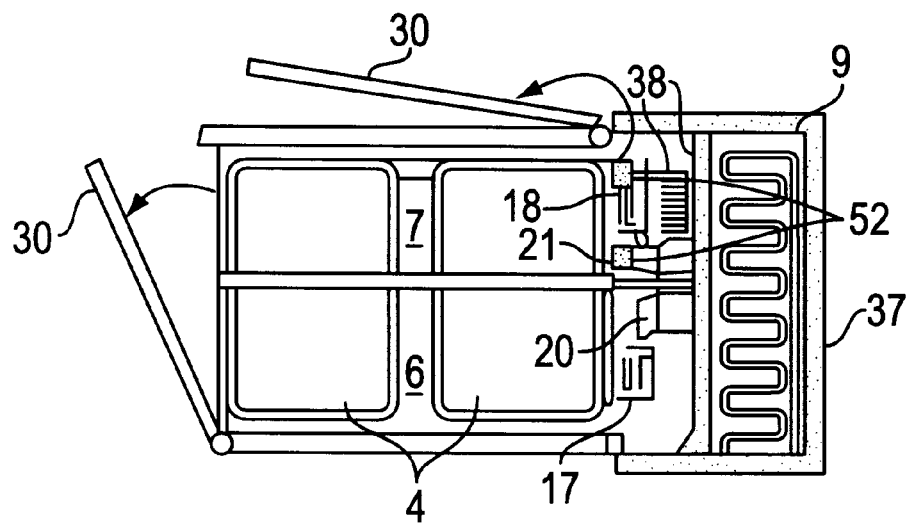

According to a variant of embodiment (FIGS. 8, 9 and 10), the device can be separated into two modules, namely the trolley 1 containing the meal trays 4 and a module 37 comprising all the refrigeration elements: reserve 9, coils 10, rotary cylinders 13, buffer reserve 12, ducts 17, 18, caloric duct 38 and heat pipes 52. This module is stationary, whereas the trolley 1 is mobile and connects to the module 37 in order to be refrigerated and reheated. To achieve this connection and to obtain the results described above, the internal elements of the trolley—the trays 4, the isothermal wall 5 as well as the openings 30—are positioned differently, without thereby changing or disturbing the effectiveness of the means contained in the module 37 which comprises the refrigeration ducts 17. In this version, the warming up can be carried out by circulating air or by means of a circuit of thermal oil in a duct 38 that is also provided with fins 39 or heat pipes 52, and the ventilating turbines 21 circulate the calories through the area 7 of the trays to be reheated when it is time to warm them up. The thermal circuit of the duct 38 duplicates the one used by the negative calories in the ducts 18 and 25 around the hot area 7 of the trolley. The thermal oil, which can rise to 300° C., is heated by a single unit of resistors 46, then propelled by a circulation pump 47 in the duct 38 to each tray individually or collectively. The turbines 21 having propelled the negative kilocalories during the waiting period under refrigeration then circulate hot air while the turbines 20 continue to ventilate the permanent refrigeration area 6. The heat pipes 52 are also heated by a heating unit 46 or plate 45.

All of the elements, such as the electrically controlled valves 23, 24, the circulation pump 22, the electrically controlled pump valve 26 and in the rear, the recovery reserve 27 with its electrically controlled valve 28, have the same functions and are used in the same way as before.

Figure 11:
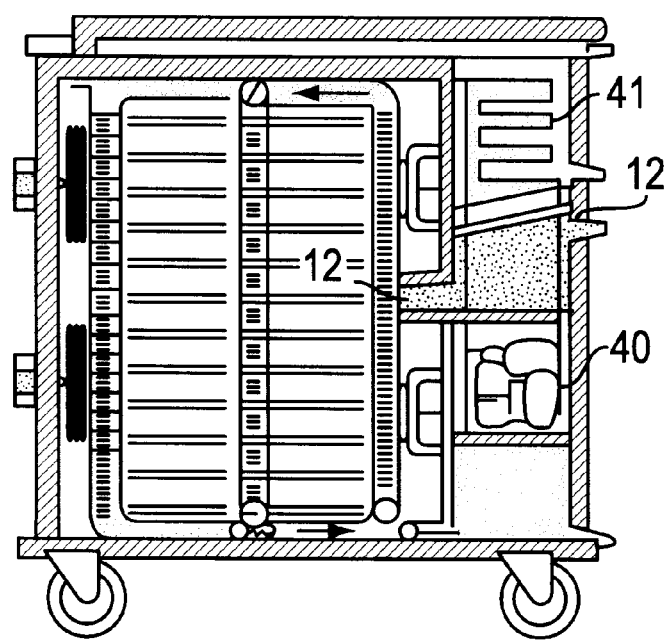
FIG. 11 is a vertical section of a trolley equipped with an integrated small compressor.

According to another variant of embodiment (FIG. 11) the trolley 1 is equipped with a domestic compressor 40 with coils 41, making it possible to lower the temperature of the liquid coolant of the reserve 9 during the waiting period for the distribution of the meal trays.

Figure 12:
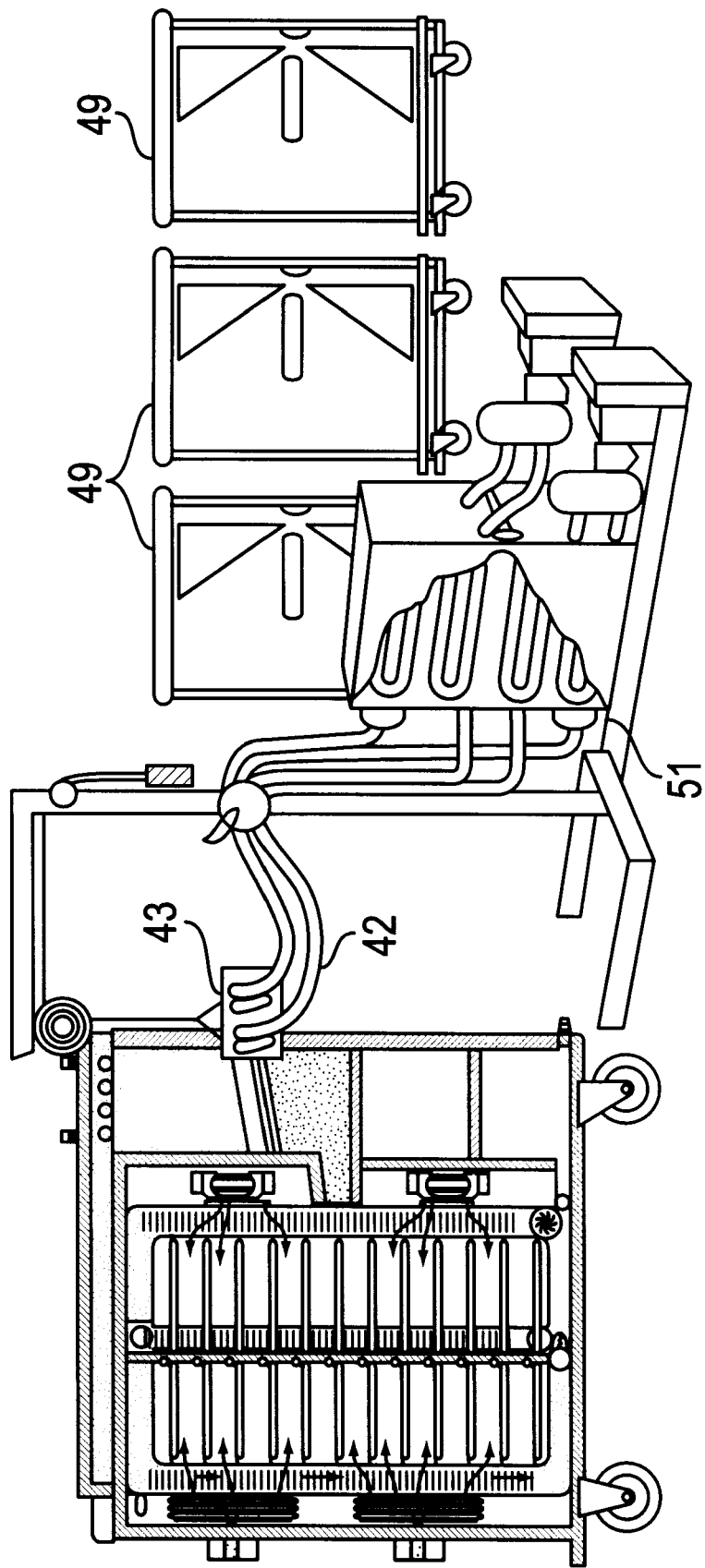
FIGS. 12, 13 and 14 show the trolley with different systems for introducing the refrigeration means.
Figure 13:
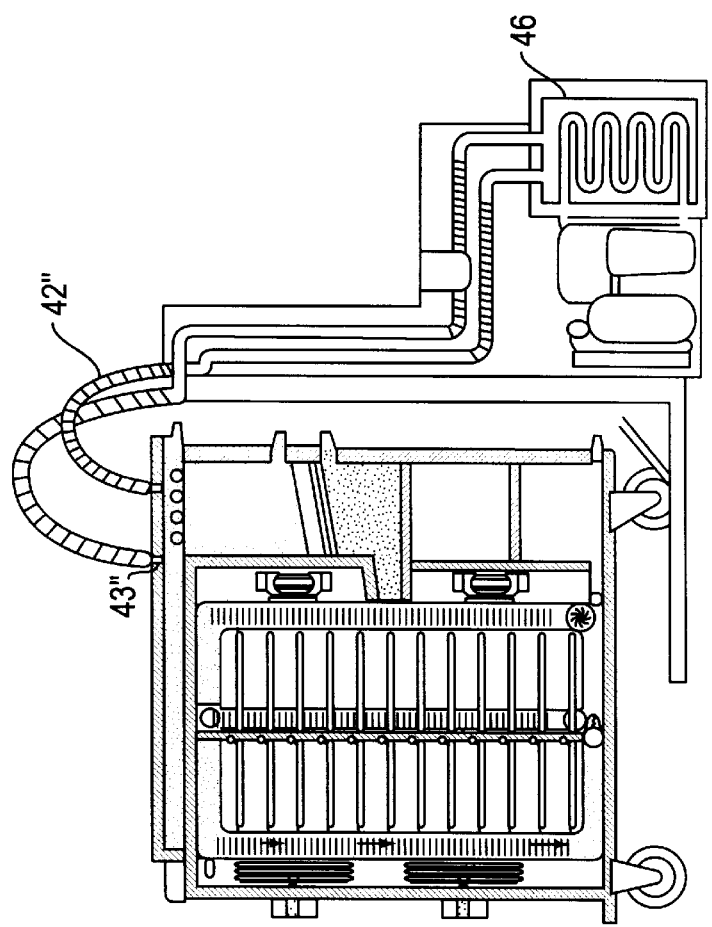

FIGS. 12 and 13 represent a trolley connected to a "refrigeration unit" 51 to be loaded with liquid coolant by a system of pipelines 42, 42" and quick-release couplings 43, 43" according to French patent No. 92.06161.

FIG. 12 shows a "line" of trolleys 49 awaiting distribution.

Figure 14:
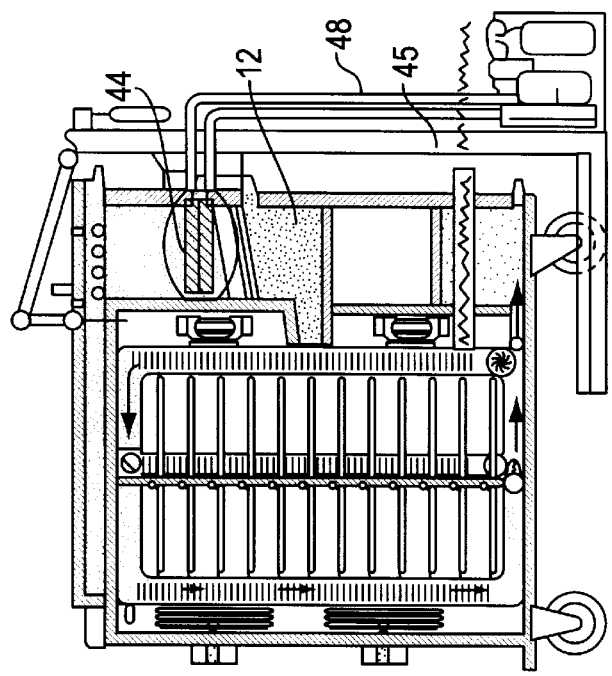

In the same way, FIG. 14, according to French patent No. 92.03982, shows the trolley connected to a device 48 comprising a coolant storage tank 44 as well as to a calorie-producing plate 45. When connected in this way, the tank 44 sends the negative kilocalories to the buffer reserve 12 during the waiting period. Likewise, the plate 45 makes it possible to reheat the mixed area 7 using either resistors or a circuit of thermal oil capable of rising to 300° C. which duplicates the one used by the negative kilocalories around the mixed area 7 of the trolley. The thermal oil is heated by a single unit of resistors, then propelled by a circulation pump to each meal tray individually or collectively. After the cool air has been evacuated, the same ventilating turbines deliver hot air.

The positioning of the various constitutive elements gives the subject of the invention a maximum number of useful effects which up to now have not been obtained by similar devices.

I claim:

1. A trolley device for distributing hot and cold meal trays having warming up and refrigeration capacities with self-contained reserve and regeneration of negative kilocalories, intended for the distribution of meal trays comprising a part with hot dishes and a part with cold dishes, and capable of being transported from one place to another and waiting for several hours while keeping all of the food at a low temperature, before warming up only the dishes that have been cooked, then cooled, which must be consumed hot, characterized in that it comprises a double housing (3) which receives the meal trays (4), constituted by a permanent refrigeration area (6) and a mixed area (7) with warming-up capacity to a predetermined temperature, separated by an isothermal wall (5) provided with slots (31) into which the meal trays (4) are inserted, said housing being cooled by means of two reserves (9, 12) of liquid coolant separated by an insulating wall (15) provided with one or more rotary cylinders (13) comprising thermoconducting sectors (14) and thermoinsulating sectors (36) disposed so as to be able to prevent or allow the passage of negative kilocalories between the two reserves depending on the position of said cylinders, the first reserve (9) containing a liquid coolant at a very low temperature, the liquid coolant (12") of the second reserve or buffer reserve (12), accelerated by a circulation pump (22), circulating in ducts (17, 18, 25) with fins (19) disposed around and in the center of the double housing (3), the warming up of the mixed area (7) being carried out by means of an electrically controlled pump valve (26) which evacuates the fluid coolant (12") from the duct (18) surrounding said mixed area and sends it to a storage reserve (27), while electrically controlled valves (23, 24) simultaneously ensure the closing of this duct and the opening of the central duct (25), normally closed, in order to continue cooling the permanent refrigeration area (6).

2. Device according to claim 1, characterized in that the regulation of the negative kilocalories passing between the first reserve (9) containing a super-cooling liquid and the buffer reserve (12) is carried out through an adjustment of the thermoconduction of the rotary cylinders (13), caused by a rotation of the latter produced by a drive system (34) controlled by a thermostat (16) and acting by means of a chain (35).

3. Device according to claim 1, characterized in that the two areas (6, 7) of the housing (3) comprise ventilating turbines (20, 21 ) creating an air flow that circulates over the fins (19) of the ducts (17, 18, 25) in order to take on negative kilocalories, said air flow then being sucked up by a turbine (48) located in the upper central part of the housing (3) in order to be forced back to the ventilating turbines (20, 21), the turbines (21) located in the mixed area (7) agitating cold air or hot air.

4. Device according to claim 1, characterized in that the first reserve (9) of liquid coolant comprises coils (10) for cooling the contents of said reserve using external means.

5. Device according to claim 1, characterized in that the first reserve (9) of liquid coolant comprises quick-release couplings (11, 11") which make it possible to introduce and evacuate said liquid coolant.

6. Device according to claim 1, characterized in that during the warming up of the mixed area (7), the calories are produced by resistors (29), and propelled in through the ventilating turbines (21), which are also used to propel negative kilocalories into said mixed area.

7. Device according to claim 1, characterized in that the warming up of the mixed area (7) is carried out by circulating thermal oil in a duct (38) provided with fins (39), or by heat pipes (52).

8. Device according to claim 1, characterized in that the trolley (1) is equipped with a small domestic compressor (40) provided with coils (41), making it possible to lower the temperature of the liquid coolant of the first reserve (9) during the waiting period for the distribution of the meal trays (4).

9. Device according to claim 1, characterized in that the trolley (1) is adapted to be able to connect to a device comprising a coolant storage tank (44) as well as to a calorie-producing plate (45), said tank sending the necessary negative kilocalories to the buffer reserve (12) during the waiting period, the plate (45) making it possible to reheat the mixed area (7).

10. Device according to claim 1, characterized in that it is constituted by two elements: the trolley (1) itself, which contains the meal trays (4), and a stationary module (37) comprising all the refrigerating elements: the reserves of liquid coolant (9), the coils (10), the rotary cylinders (13) and the ducts (17, 18, 25) for circulating the fluid coolant (12"), the trolley (1) being detachable and capable of being connected to said stationary module.

11. Device according to claim 1, characterized in that the slots (31) of the isothermal wall (5) are each closed in the absence of a meal tray (4) by means of a rotary joint (8) with a longitudinal stop (32) determined such that a thrust on its base (33) exerted by the meal tray (4) causes the stop (32) to be raised, thus freeing the passage for the meal tray, which in turn closes off the slot (31).

\* \* \* \* \*